US012724643B1

(12) United States Patent
Kuperman et al.

(10) Patent No.: US 12,724,643 B1
(45) Date of Patent: Sep. 1, 2026

(54) OPTIMIZED POD PROVISIONING IN KUBERNETES AUTO-SCALER ENVIRONMENT

(71) Applicant: CAST AI Group, Inc., North Miami Beach, FL (US)

(72) Inventors: Leonid Kuperman, Toronto (CA); Laurynas Stasys, Vilnius (LT)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 18/913,754

(22) Filed: Oct. 11, 2024

Related U.S. Application Data

(60) Provisional application No. 63/592,079, filed on Oct. 20, 2023.

(51) Int. Cl.
*G06F 9/50* (2006.01)

(52) U.S. Cl.
CPC .................................... *G06F 9/505* (2013.01)

(58) Field of Classification Search
CPC ....................................................... G06F 9/505
See application file for complete search history.

(56) References Cited

U.S. PATENT DOCUMENTS

2019/0312800 A1* 10/2019 Schibler .............. H04L 63/1433
2020/0241921 A1* 7/2020 Calmon .................. G06F 30/20
2021/0019194 A1* 1/2021 Bahl ................... H04L 67/1031
2022/0417173 A1* 12/2022 Jijumon .............. H04L 43/0852
2024/0220329 A1* 7/2024 Malvankar ............. G06N 3/092
2025/0094225 A1* 3/2025 Malvankar ............. G06N 20/00

OTHER PUBLICATIONS

Abdel Khaleq, A. et al., "Intelligent Autoscaling of Microservices in the Cloud for Real-Time Applications," IEEE Access, vol. 9, Feb. 24, 2021, pp. 35464-35476.

* cited by examiner

*Primary Examiner* — Sisley N Kim
(74) *Attorney, Agent, or Firm* — Fenwick & West LLP

(57) ABSTRACT

A scaling system receives a request for deploying a target application in a computing environment. The request includes performance metrics for deploying the target application. The computing environment may include a set of computing resources. The scaling system determines metadata associated with the target application. The metadata describes a workload for deploying the target application. The scaling system generates a state of the computing environment. The state may represent a status of the set of computing resources and the workload of the target application. The scaling system provides the generated state and the requested performance metrics as an input to a deep reinforcement learning (DRL) model to receive an action of allocating the set of computing resources. The scaling system receives an output from the DRL model. The output includes at least one action of allocating computing resources for deploying the target application in the computing environment.

20 Claims, 7 Drawing Sheets

OPTIMIZED POD PROVISIONING IN KUBERNETES AUTO-SCALER ENVIRONMENT

CROSS-REFERENCE TO RELATED APPLICATIONS

This application claims the benefit of and priority to U.S. Provisional Application No. 63/592,079, filed Oct. 20, 2023, which is hereby incorporated by reference in its entirety.

TECHNICAL FIELD

The disclosed configuration relates generally to computing resources, and more particularly to allocation of computing resources in Kubernetes.

BACKGROUND

Scaling tools are used to scale nodes, as well as Kubernetes pods that are provisioned to nodes, up and down depending on the dynamic needs of a service that is deployed. For example, horizontal pod autoscaler (HPA) and Kubernetes event-driven autoscaling (KED) are used to adjust the number of pods in a deployment or scaled job based on real-time needs. By increasing the number of pods, more tasks can be processed simultaneously. These scaling tools rely on various metrics, such as CPU usage, memory consumption, and customer defined metrics, etc., to determine when and how to scale. These metrics need to be specified and monitored for setting the rules that instruct when and how the computing resources should be adjusted.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
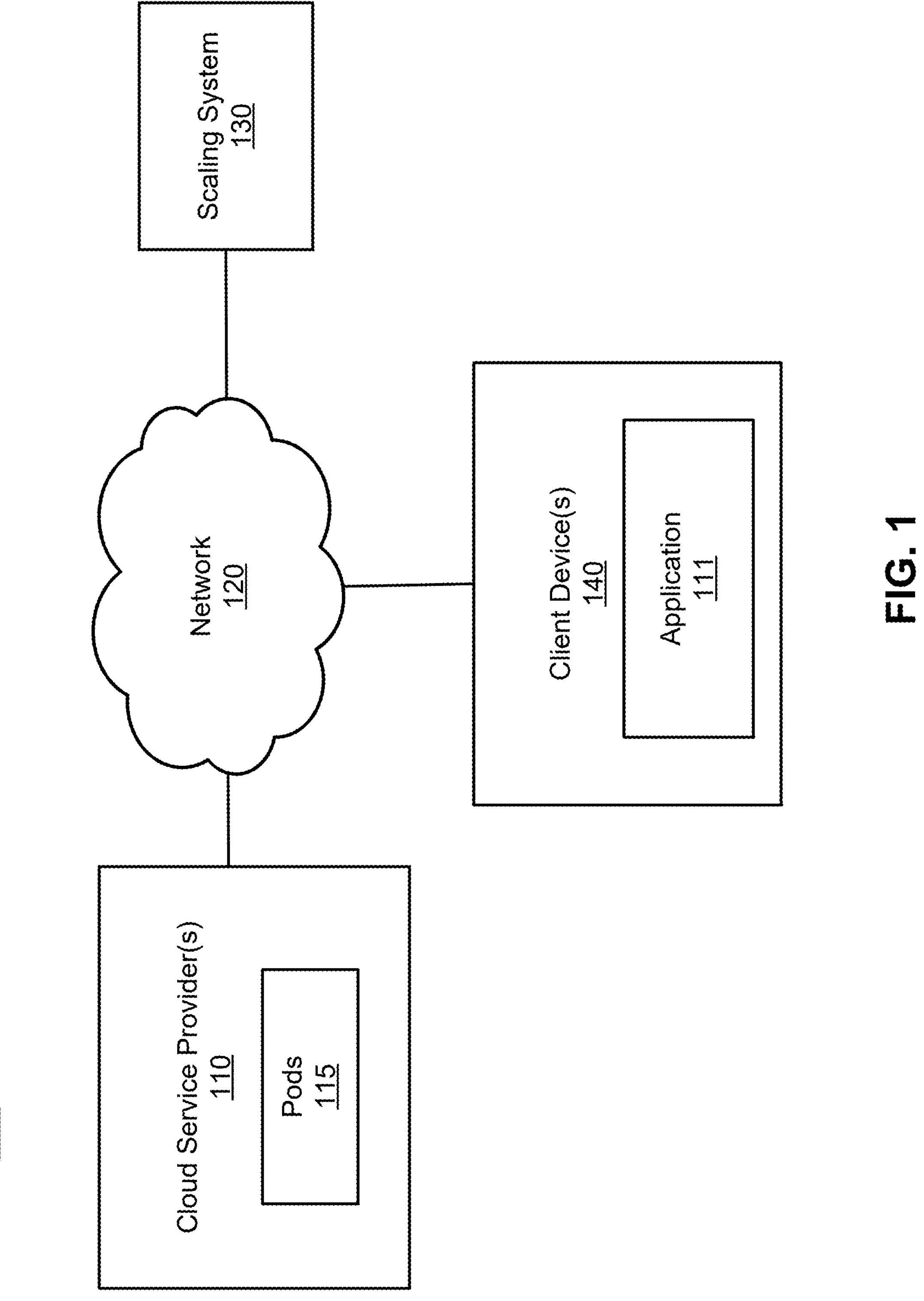
FIG. 1 illustrates one embodiment of a system environment for deploying a scaling system.

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Cloud Service Provider Introduction

The term CSP, as used herein, may refer to an enterprise that provides Infrastructure as a service such as compute, storage and network. CSPs may also provide higher-order services such as database, messaging, search, Machine Learning, data processing, etc. Users may use the services provided by CSPs to execute workloads such as applications that run on a computer. For example, workloads may require storage and network capabilities from a CSP and may be executed across one or more CSPs using different resources available. A workload may be a traditional application hosted on a virtual machine or a Cloud Native container-based application. Each CSP may have multiple geographical locations where the physical data centers are deployed, and each such geographical location may be referred to as a cloud region for the CSP.

Within each CSP, multiple compute devices or nodes may run workloads. In some embodiments, workloads are organized into containers for execution. The term container, as used herein, may refer to an application footprint that includes the application and the required library dependencies to run. A container requires a container engine such a Docker to execute, where a Docker is a platform and tool for building, distributing, and running Docker containers. To manage and provision containerized workloads and services, the platform Kubernetes may be used to help facilitate both declarative configuration and automation. The term, Kubernetes, as used herein, is a portable, extensible, open-source platform for managing containerized workloads and services, that facilitates both declarative configuration and automation. For example, Kubernetes runs workload by placing containers into pods to run on nodes, where a node may be a virtual or physical machine and a group of nodes may be referred to as a cluster.

In one embodiment, within a CSP, multiple computing devices may communicate with each other through a VCN (virtual cloud network), which is a virtual version of physical computer network that is created and utilized within a CSP. The VCNs provide private networking, public networking and support the common networking protocols such as TCP (Transmission Control Protocol) and UDP (User Datagram Protocol). Multiple computing devices containing pods may communicate with each other across multiple clouds as well.

DISCLOSURE OVERVIEW

Auto-scaling devices may be implemented to scale nodes up or down on an as-needed basis for a service deployment on a CSP. The auto-scaling devices may detect the need to scale based on demand, requests from a user of a CSP, or any other mechanism. Auto-scaling devices operating on a containerized service operate at a higher abstraction layer than the containerized service itself. For example, with respect to Kubernetes, an auto-scaling device acts at a higher level than a Kubernetes control plane. Usage of auto-scaling devices contribute to cost optimization, resource usage efficiency and cost-effectiveness by providing compute for services when needed and for as long as needed by autoscaling the compute up and down on the as-needed basis.

Despite advancements in auto-scaling devices, users still encounter several technical challenges. A significant issue is that users need to manually determine HPA metrics and scaling rules, which requires users to actively define and adjust these parameters. Users face several interdependent and often conflicting objectives. From one perspective, users aim to reduce operational costs by minimizing pod counts and optimizing resource requests and limits, ensuring efficient utilization of resources. This helps in lowering costs while maintaining streamlined operations. On the other side, users seek to reduce application error rates, which requires advanced and dynamic resource management, as well as improving application latency to maintain responsiveness and reliability. These goals demand precise resource allocation for each pod, ensuring that they meet workload demands without over-provisioning, which would lead to increased costs. Achieving this balance requires an automated solution capable of dynamically adjusting both pod counts and individual pod resource configurations in real-time, based on changing demand and workload conditions.

Additionally, some current documentation explicitly advises against using the Vertical Pod Autoscaler (VPA) and Horizontal Pod Autoscaler (HPA) simultaneously, leading to confusion for users. However, a dual setup involving both VPA and HPA is technically feasible, particularly when HPA is configured to scale based on custom or external metrics (excluding CPU or memory), while VPA handles pod resizing based on resource requests. In such configurations, HPA scales the number of pods in response to external metrics, while VPA optimizes resource allocation by adjusting pod sizes. However, the two scaling mechanisms may send conflicting signals. For example, if HPA increases the number of pods to handle increased CPU usage, but at the same time VPA increases the resource requests for each pod, it may lead to overprovisioning. Conversely, if VPA reduces resource requests, HPA might incorrectly scale down pods, thinking the workload has decreased. The Kubernetes ecosystem lacks a comprehensive solution that fully integrates the benefits of both auto-scaling devices, highlighting a significant technical gap.

Moreover, given the sensitive nature of these environments, arbitrary changes to pod counts, requests, and limits may potentially lead to failure conditions within the computing clusters. In such high-stakes environments, every adjustment carries potential risk. A sudden increase or decrease in pod counts could disrupt service stability, affecting the customer's operations. Misjudged limits or requests might result in either wasted resources or insufficient allocation, both of which are far from ideal in a production setting.

One embodiment of a system and method herein includes a deep reinforcement learning (DRL) model for pod scaling and computing resources allocation. In one aspect, a scaling system receives a request for deploying a target application in a computing environment. The request includes performance metrics for deploying the target application. The computing environment may include a set of computing resources, such as clusters of pods in Kubernetes environment. The scaling system determines metadata associated with the target application. The metadata describes a workload for deploying the target application. The scaling system generates a state of the computing environment which represents a status of the set of computing resources and the workload of the target application. The scaling system provides the generated state and the requested performance metrics as an input to a DRL model to receive an action of allocating the set of computing resources. The output actions from the DRL model includes at least one action of allocating computing resources for deploying the target application in the computing environment. In some embodiments, the output actions may include both HPA and VPA actions. For example, the output actions may include scaling the number of pods and scaling the CPU and/or memory sizes for each pod, e.g., increasing/decreasing the number of pods and the CPU and memories in each pod.

The disclosed system and method use advanced machine learning models and carefully design the learning process. The disclosed method is coupled with rigorous testing in simulated or non-production environments and allows a DRL model to learn effectively while ensuring that changes made in the environment remain within acceptable boundaries and are aligned with maintaining the stability and performance of the computing clusters. The DRL model continuously receives updated metrics and adjusts its recommendations on actions to allocate computing resources accordingly, adapting to changes in the application's workload and performance requirements. The DRL model provides computing resource allocation actions that include both HPA and VPA actions so that the HPA actions scale the number of pods based on traffic or resource usage (like CPU, memory, or custom metrics), handling fluctuations in workload while the VPA actions handles the resource requests and limits for each individual pod by adjusting CPU and memory based on usage patterns which prevents over-provisioning or under-provisioning of resources within a pod. This combination provides a comprehensive resource management strategy which helps handle both the load spikes (with HPA) and the correct allocation of resources (with VPA), improving performance and preventing pods from crashing due to insufficient resources or unnecessary overhead. Additionally, this dynamic scaling approach reduces infrastructure costs by ensuring that resources are used as efficiently as possible, both horizontally and vertically.

FIG. 1 illustrates one embodiment of a system environment for deploying a scaling system. As depicted in FIG. 1, the system environment 100 includes cloud service provider(s) (CSP) 110 having pods 115, network 120, a scaling system 130, and client device(s) 140. In alternative configurations, different and/or additional components may be included in the system environment 100. The computing devices of the system environment 100 may include some or all of the components (systems (or subsystems)) of a computer system 500 as described with FIG. 5. In some embodiments, the computing devices may be configured with software to function as specifically described herein. For example, program code comprised of instructions may cause a processing system to be structured in a manner so that the device operates the specific functionality upon execution of the program code.

The CSP 110 may include any number of CSPs used to deploy a service. The CSPs deploy containerized workloads that may be distributed across pods 115. While Kubernetes is referred to throughout this disclosure, this is merely for convenience, and any containerization service may be used in place of Kubernetes.

Network 120 may be any network capable of transmitting data communications between any entity shown in FIG. 1 or described herein. Exemplary networks that network 120 may embody include the Internet, a local area network (LAN), a wide area network (WAN), a VPN (virtual private network), a VCN (virtual cloud network), a VXLAN (virtual extension local area network), Wi-Fi, Bluetooth, and any other type of network.

Scaling system 130 performs scaling operations to allocate computing resources for deploying a target application in a computing environment, e.g., a Kubernetes environment. The Kubernetes system may include a set of computing resources, e.g., clusters of pods. When receiving a request for deploying a target application in the computing environment, the scaling system 130 determines an allocation of computing resources based on the target application, the computing environment and the user requested performance metrics. While scaling system 130 is depicted outside of the CSP 110, scaling system 130 may be deployed directly within a Kubernetes cluster within one or more CSPs 110. Details of activity of scaling system 130 are provided below with respect to FIGS. 2A-5.

The client devices 140 are computing devices that display information to users and communicates user actions to the systems of the system environment 100. In one embodiment, client devices 140 of the system environment 100 may include some or all of the components (systems (or subsystems)) of a computer system 500 as described with FIG. 5. In some embodiments, the client devices 140 include application 111 which may be a dedicated application provided (either directly, or indirectly (e.g., via an app store)) by the scaling system 130 or may be an application accessed using a browser of client device 140 (e.g., hosted by one or more servers of the scaling system 130). Application 111 may be used to output information to the user (e.g., via a display, speakers, etc.) and receive input from the user (e.g., via voice, keyboard, touchpad, or any other inputs). In another embodiment, the client device 140 interacts with the various systems of the system environment 100 through an application programming interface (API) running on a native operating system of the client device 140, such as IOS® or ANDROID™.

Figure 2A:
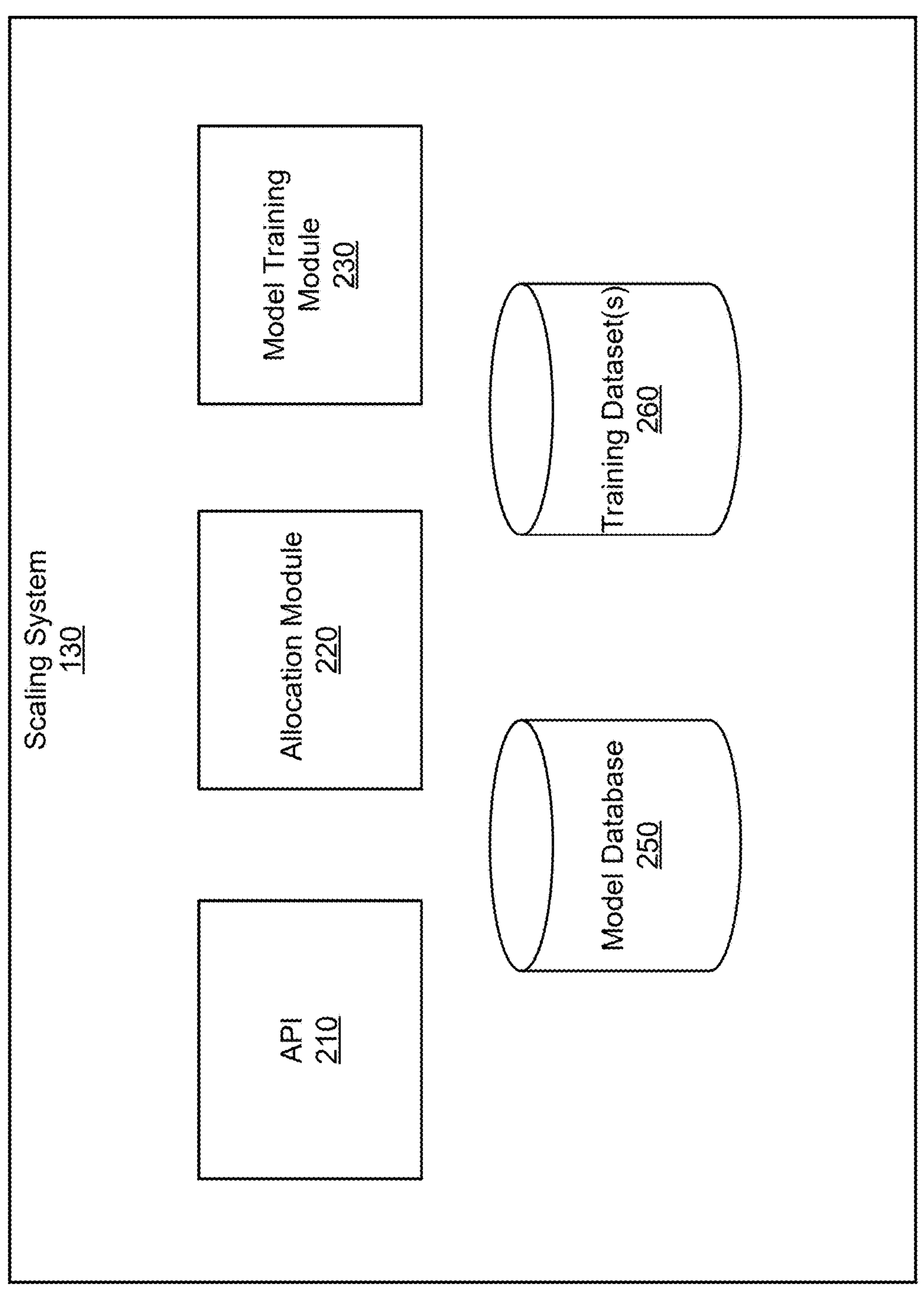
FIG. 2A illustrates one embodiment of exemplary modules used by the scaling system.

FIG. 2A illustrates one embodiment of exemplary modules used by the scaling system. As depicted in FIG. 2A, the scaling system 130 includes an API 210, an allocation module 220, a model training module 230, a model database 250, and training dataset(s) 260. The modules and databases depicted in FIG. 2A are merely exemplary, and more or fewer modules and/or databases may be used to achieve the functionality disclosed herein.

The API 210 includes application programming interfaces for users of client devices 140 to communicate with the scaling system 130. The API 210 may correspond to the application 111 and allow users to input requests, review information associated with application deployment and computing resource allocations and adjust settings of the computing resource allocation. In one implementation, a user may use the API 210 to send a request to the scaling system 130. The request may be associated for allocating computing resources for deploying a target application in a computing environment based on a workload of the deployment. In some implementations, the computing environment may be a Kubernetes environment. The workload of the deployment may refer to an amount of computing resources required to deploy the target application with some specific metrics in the computing environment. For example, the workload may require a certain number of running pods in a Kubernetes cluster, and each pod may include certain sizes of CPUs, memories, and the like. Each workload may have unique metrics (e.g., performance characteristics and objectives) that may be determined by the target application, the computing environment, and/or the user requirements. In some embodiments, the API 210 may communicate with the CSP 110.

The API 210 may provide an interface for the users to define a specific metric for the deployment. In some implementations, the scaling system 130 may provide a machine learning model to determine an allocation of the computing resources. For example, the machine learning model may include a deep reinforcement learning (DRL) model. The API 210 may include an interface for the user to customize the reward function of the DRL model. In one example, the user may define and establish a reward or penalty for maximizing or minimizing the metric for deploying a target application. For example, the API 210 may provide an interface that allows users to adjust parameters associated with the allocation of the computing resources, for example, cost, error rate, latency, uptime, and other user optimization metrics. These parameters may be associated with the reward function of the DRL model. The API 210 may communicate and provide the change of the reward function and the associated change in the computing resource allocation caused by adjusting the parameters.

Figure 2B:
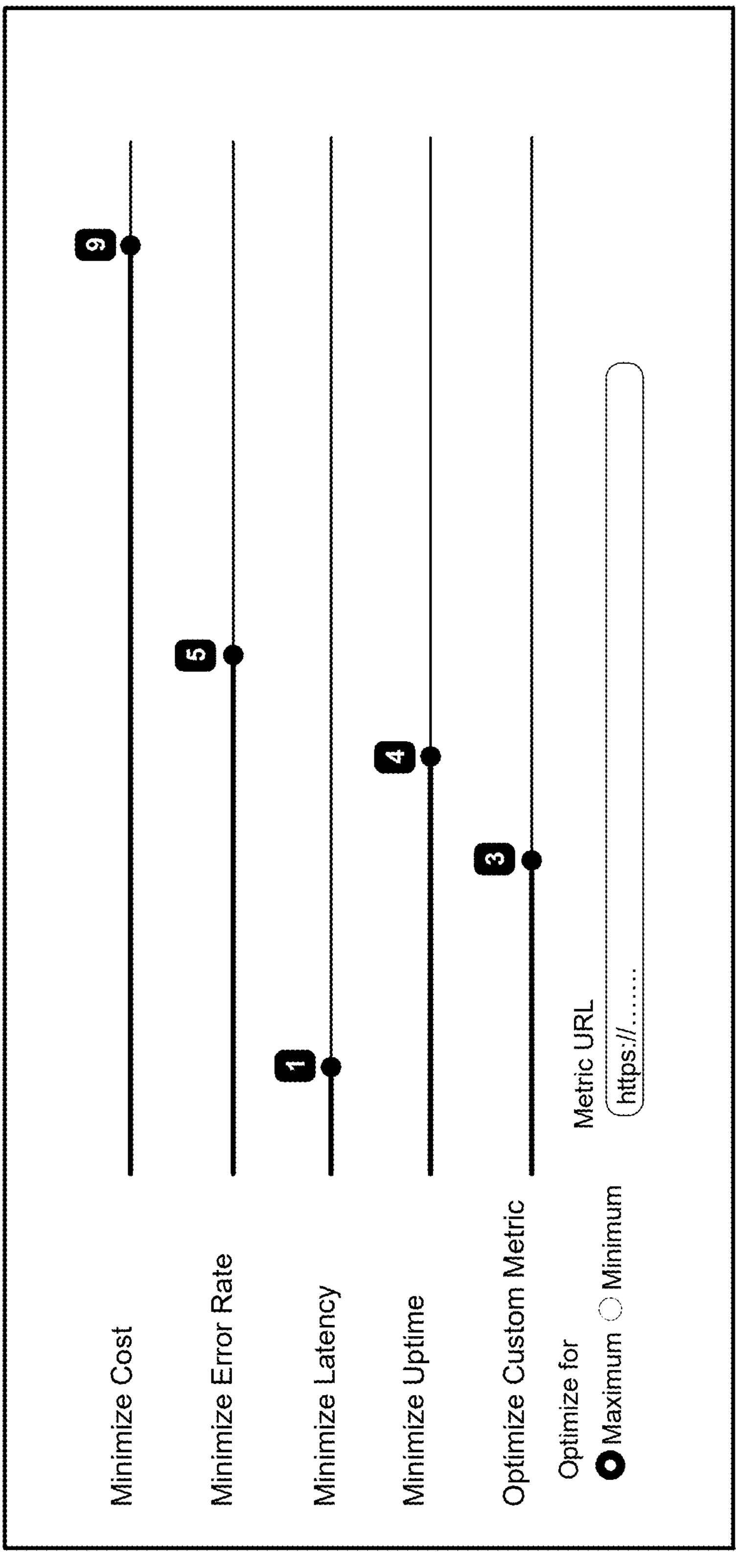
FIGS. 2B-2C illustrate example user interfaces that are provided by the scaling system.
Figure 2C:
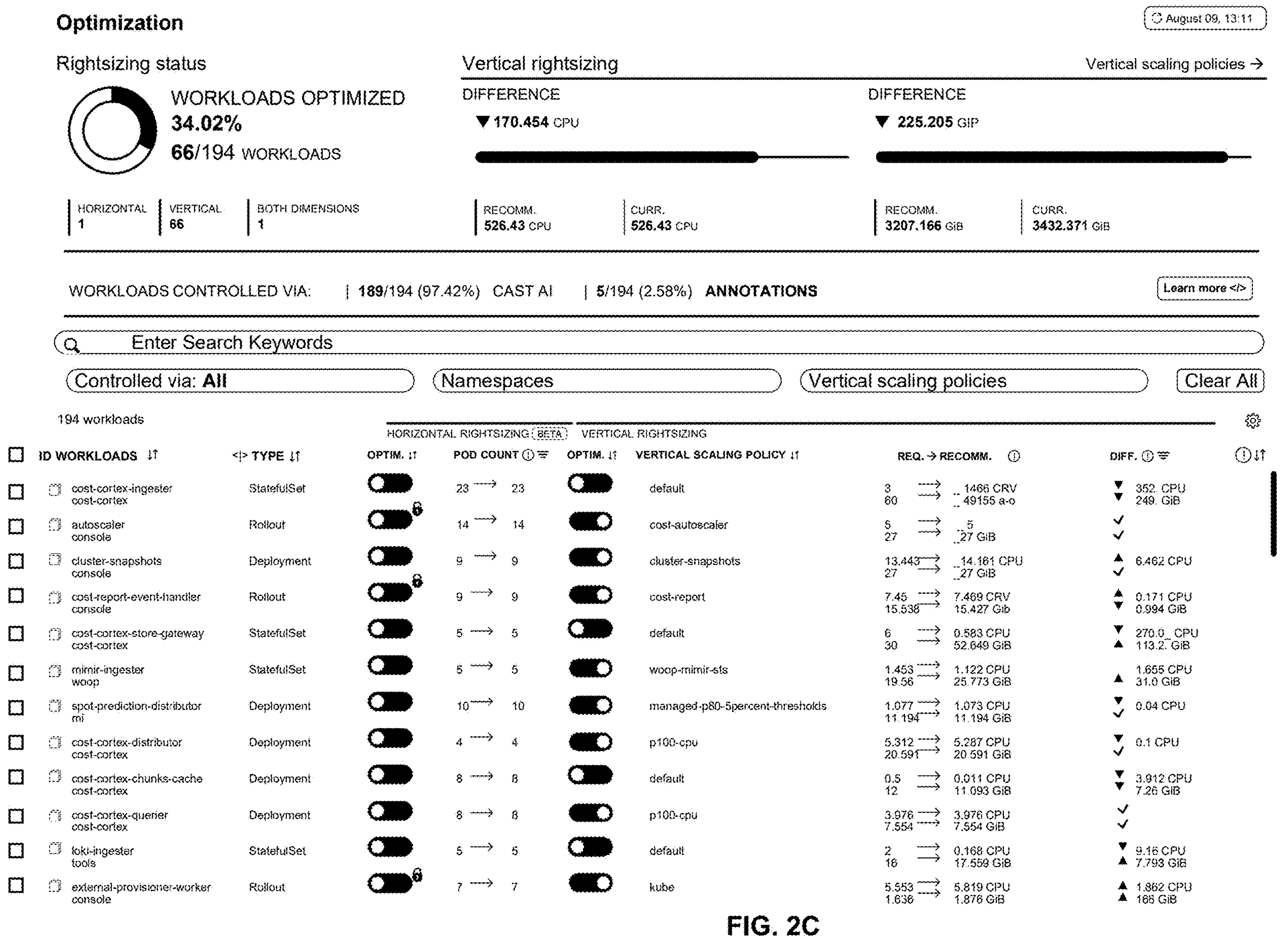

FIGS. 2B and 2C illustrate example user interfaces that are provided by the scaling system 130. As shown in FIG. 2B, the API 210 may provide an interface that allows for the customization of weights of the reward function of the DRL model, giving user control over the learning priorities of the DRL model. For instance, one user may prioritize cost reduction above all else, while another user may be more focused on minimizing service latency. These distinct requirements may be reflected by adjusting the corresponding sliders in the interface, effectively assigning more weight to the cost or latency reward function, respectively. By manipulating the sliders, users may intuitively and visually adjust the weight of each reward function, influencing the DRL agent's learning process to prioritize certain goals over others, as shown in FIG. 2C. This introduces an interactive element, enabling user to directly influence the management of the Kubernetes resources.

Referring back to FIG. 2A, the allocation module 220 performs scaling operations to allocate computing resources for deploying a target application in a computing environment. The allocation module 220 may receive a request for deploying a target application in a computing environment. The request may include performance metrics for deploying the target application. In some embodiments, the performance metrics may be determined by the user. For example, the performance metrics may include operating cost, error rate, latency, uptime, and other parameters for deploying the target application in the computing environment. The computing environment may be a Kubernetes system and include a set of computing resources, such as a plurality of clusters of pods. Each pod may be allocated with various sizes of CPU and memories. The allocation module 220 may determine the metadata of the target application. The allocation of computing resource for deploying the target application may be associated with the workload of the deployment, and the workload may be specified by metadata of the target application. For example, the workload may be determined based on the functions and behaviors of the target application which may be specified by the metadata of the target application. In one implementation, the allocation module 220 may access a container layer of the target application and examine the target application from its images, operating layers, and/or application layers to determine metadata of the application. In some examples, the metadata of a target application may include expected CPU and memory requirements, number of replicas or instances, expected traffic or workload profile, etc. For instance, the metadata may specify whether the target application includes single threaded programs that execute one task/thread at a time in sequence and thus adding more CPU cores will not expedite the execution; or multi-threaded programs that execute multiple tasks/threads concurrently, either by switching between them rapidly (with only one CPU core) or by running them in parallel by multiple CPU cores. In some embodiments, based on the determined metadata, the allocation module 220 may group the applications with similar metadata and/or similar workloads into a same category.

In some embodiments, the allocation module 220 may use a machine learning model to determine the allocation of computing resources for deploying the target application. In some embodiments, the machine learning model may be DRL model. The allocation module 220 may generate a state of the computing environment. The state may be a current state of the computing environment that represents a current status of the set of computing resources and the workload of the target application. In some embodiments, the state may include various information, such as, current cluster load, resource availability, current traffic/load conditions, cluster configurations, and the like. The state may specify status such as CPU and memory utilization, number of running pods, node capacities, free resources on each node, active requests, service demands, workload expectations for deploying the target application, e.g., latency, resources usage, etc.

The allocation module 220 provides the generated state as input into the DRL model. In some implementations, the input may further include user requested performance metrics, e.g., operating cost, error rate, etc. The DRL model is trained to output one or more actions of allocating the set of computing resources for deploying the target application. In some implementations, the DRL model is trained to optimize resource allocations in a Kubernetes environment. The DRL may make real-time decisions on the provisioning of resource allocations when an application deployment request is received. In some examples, the actions may include adjusting the pod count, modifying CPU requests, altering memory requests, changing CPU limits, modifying memory limits, annotating the workload to run on instances optimized for computation, annotating the workload to run on network-optimized instances, annotating the workload to execute on storage-optimized instances, annotating the workload to partially operate on spot instances, adjusting the number of pods that operate on spot instances, etc. The allocation module 220 receive output from the DRL model, e.g., one or more actions of allocating the set of computing resources. In some embodiments, the output actions may include both HPA and VPA actions. For example, the output actions may include adjusting the number of pods and adjusting the CPU and/or memory sizes for each pod. For instance, the action may be allocating 500 m CPU and 1 GiB of memory for each pod, deploying 4 replicas initially with HPA thresholds set to 70% CPU utilization, using VPA to automatically increase memory limits if utilization exceeds 80%, and the like.

In some implementations, the allocation module 220 may provide the metadata of the target application to a machine learning model to predict a dynamic workload of the target application. For example, the machine learning model may predict, as the deployment of the target application process, that the computing environment may change, and that the workload such as CPU and memory usage/requirement may change, etc. The allocation module 220 may use the predicted dynamic workload of the target application to generate a predicted state of the computing environment. The predicted state may represent the status of the set of computing resources and the predicted workload of the target application. The allocation module 220 applies the DRL model to the predicted state and the requested performance metrics to receive a dynamic output which includes one or more actions of allocating computing resources based on the predicted dynamic workload. In one implementation, the allocation module 220 may observe a state-action-reward cycle, may monitor the deployment of the target application, e.g., latency, throughput, resource utilization, etc., and may adjust the resource allocation accordingly. For example, if a cluster of pods is under pressure, the allocation module 220 may rebalance workloads or modify scaling strategies to meet requested performance metrics.

In some implementations, the allocation module 220 may access a data store (e.g., model database 250) which is a repository of pre-trained DRL models. Each pre-trained DRL model may be specifically trained for a category/type of applications. Applications with similar workloads for deployment may be categorized in the same category. Each pre-trained DRL model may be used to allocate computing resources for the respective type/category of applications. In some embodiments, the type and the amount of workloads may be associated with the functions and behaviors of the application. In some embodiments, the allocation module 220 may determine similar applications based on their metadata. For example, the allocation module 220 may access the container layer of an application and examine the application from its images, operating layers, and/or application layers to determine the characteristic attributes and metadata of the application. Based on the determined characteristic attributes and metadata, the allocation module 220 may group the applications into different types/categories. In some embodiments, the allocation module 220 may generate an automatic pipeline for allocation computing resources for a target application. For example, the allocation module 220 may determine the metadata of the target application and determine one or more applications in the data store that have a similar workload with the target application. The allocation module 220 may then identify one or more pre-trained models from the data store that are associated with the determined similar applications. The allocation module 220 may apply at least one of the identified pre-trained models to the target application to receive actions of allocating computing resources for deploying the target application in the computing environment.

The model training module 230 instructs and coordinates training of one or more machine learning models. In some embodiments, the machine learning models include one or more pre-trained DRL models. In one implementation, a pre-trained DRL model may be trained in a simulation environment, e.g., pre-production or staging environment. The simulation environment replicates the real computing environment that a target application will be deployed. The simulation environment may include similar workload patterns, resources limitations, application behaviors as the real computing environment. The simulation environment may be used to explore the state-action space of the DRL model. The DRL model can be evaluated and iteratively improved based on the results of the output actions in the simulation environment.

Figure 3:
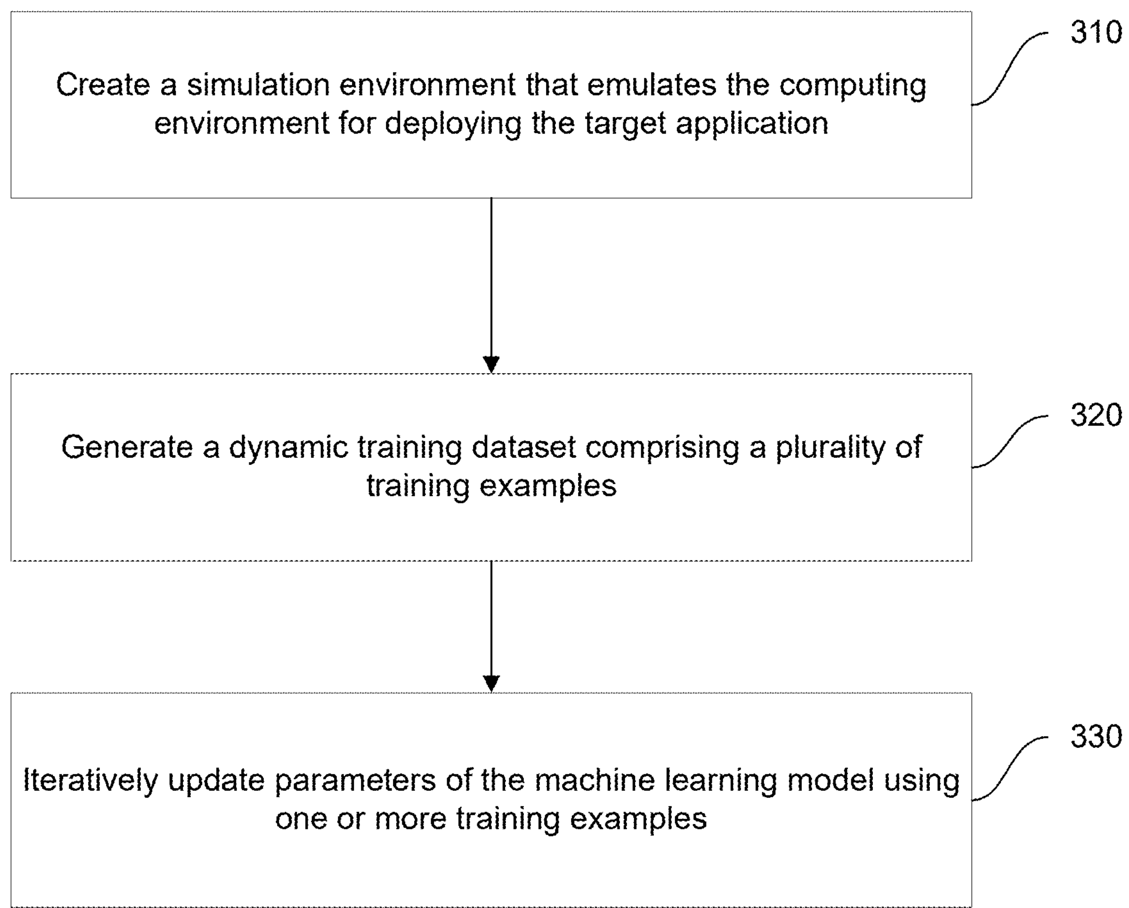
FIG. 3 illustrates an example process of training an example DRL model.

FIG. 3 illustrates an example process 300 of training an example DRL model. The model training module 230 may create 310 a simulation environment that emulates the computing environment for deploying the target application. The model training module 230 may generate 320 a dynamic training dataset for training the DRL model. The training dataset may include a plurality of training examples. Each training example may be generated by applying the DRL model to a respective initial state of the simulation environment. For example, the model training module 230 may generate a training example by determining an initial state of the simulation environment and applying the DRL model to the initial state to output an action of allocating computing resources in the simulation environment. The model training module 230 applies the output action to the initial state to obtain a resulting state of the simulation environment and determines a value of a reward function based on the resulting state of the simulation environment. The value of the reward function may reflect performance metrics for deploying the target application in the simulation environment. The model training module 230 may iteratively update 330 parameters of the DRL model (e.g., weights of one or more reward functions) using one or more training examples.

In some embodiments, a reward function may represent a specific objective of the DRL model. In one example, a reward function may be associated with the cost of running pods. For instance, lower costs yield higher rewards, and the DRL model is incentivized/trained to determine actions that minimize the cost of running the pods while ensuring effective performance. The reward function may be calculated based on the metrics monitored by the scaling system 130. In another example, a reward function may be associated with error rates such that higher error rates are penalized, and lower error rates yield higher rewards. In yet another example, a reward function may be associated with service latency, e.g., latency in serving requests. Pods that fulfill requests with lower latency are rewarded and higher latency are penalized. In still another example, a reward function may be associated with out of memory (OOM) kills. The reward function may be designed to penalize OOM events, and the DRL model is trained to disincentivize actions that lead to memory requests that are too low and/or subsequent OOM kills.

By learning from the rewards and penalties, the DRL model may develop a policy that balances the objectives, for example, obtaining an optimal trade-off that minimizes costs and errors, reduces latency, and avoids OOM kills. The rewards and penalties must be carefully balanced to avoid favoring one objective over others unintentionally. In some embodiments, users may specify/adjust parameters for the awards/penalties for the DRL model. For example, a user may adjust the weights of each reward function by adjusting the requested performance metrics according to the user's specific requirements/preferences. The user may modify the requested performance metrics, for example, by sliding the bar values in FIG. 2B, e.g., increasing the weight of minimizing cost, lowering the weight of minimizing error rate, etc. The modified requested performance metrics may be provided to the DRL model with the generated state as input. The model training module 230 may update the reward function based on the modified requested performance metrics, determine an updated value of the reward function for the training examples and update the parameters of the DRL model based on the updated training examples. In this way, the user may control the DRL training process to prioritize certain goals over others.

In some embodiments, the model training module 230 may generating the training examples with spot instances to necessitate more extended training periods. A spot instance is a type of virtual machine (VM) available in the computing environment that allows users to bid on unused computing capacity at a significantly reduced cost compared to standard, on-demand instances. Spot instances provide a way to access the computing resources at a reduced cost but with the trade-off of possible interruptions. The training period may encompass these interruptions to fully understand their impact on the reward function.

In one embodiment, as the machine learning models are deployed, the model training module 230 may obtain feedback from users with respect to the outputs that were generated by the machine learning models. The model training module 230 may observe the outcomes, and receive rewards or penalties based on the outcomes of the actions. For example, the scaling system 130 may perform an action of allocating computing resources to the generated state of the computing environment. The action is one of the one or more output actions from the DRL model. The scaling system 130 may obtaining a resulting state of the computing environment, the resulting state is generated by performing the action to the generated state. The model training module 230 determines a reward value of the reward function based on the resulting state of the computing environment. In some examples, the model training module 230 may determine whether the reward value is a positive or negative feedback to the DRL model. The model training module 230 updates the parameters of the DRL model based on the generated state, the at least one action, the resulting state and the reward value.

In some embodiments, the model training module 230 may generate the pre-trained models for a plurality of applications. Different application may be categorized into different categories/types. Applications that belong to a same category/type may have similar metadata and/or workload during deployment in the computing environment. In one example, the model training module 230 may start with a first application AAA and train a DRL model for the application AAA by profiling and scaling the application AAA in several iterations. Each iteration may correspond to a computing resource allocation state, which may include the pod counts, CPU utilization, memory usage and other relevant metrics for deploying the application AAA. By adjusting the states for the application AAA, the model training module 230 may learn how to allocate computing resources for the application AAA to improve performance (e.g., reduce error rates) and reduce costs. The model training module 230 may use the pre-trained model of the application AAA to obtain DRL models for other applications that belong to the same category/type of the application AAA. For example, the model training module 230 may use application AAA's DRL model as a start point and finetune the DRL model based on the respective metadata/workload of applications in the same category. Similarly, the model training module 230 may pre-train a model for an application BBB which belongs to a different application type of the application AAA. In one implementation, the model training module 230 may obtain a repository of the pre-trained models for different types of workloads/applications. The pre-trained models may be stored in a repository, e.g., the model database 250.

In some embodiments, the model training module 230 may test the trained DRL model in a live environment, e.g. the actual computing environment that the target application is deployed. The model training module 230 may allow minor adjustments in areas of the computing environment that are less critical or have more tolerance for change. For instance, the model training module 230 may allow the scaling system 130 to take actions such as altering the pod counts for non-critical services during off-peak hours. As the DRL model successfully navigates these low-stakes scenarios, the model training module 230 may gradually increase the range and impact of the actions allowed to perform. Throughout this process, the DRL model continuously learns from the feedback, e.g., the impact of the actions on the application and computing environment, such as costs, the requested performance metrics associated with the reward function. In some embodiments, the model training module 230 may include fail-safe measures that revert changes if certain metrics go beyond predefined thresholds. By gradually introducing actions, the model training module 230 may create a controlled learning environment where the DRL model start to apply and adapt its learned policies based on real-world feedback.

The model database 250 stores one or more machine learning models. In one instance, the machine learning model includes a DRL model that outputs one or more actions for allocating computing resources for deploying an application. The machine learning models are large-scale models with a significant number of weights or parameters. The models may be configured to perform natural language processing (NLP) tasks, audio processing tasks, image processing tasks, video processing tasks, and the like. In one embodiment, the machine learning models are configured as a transformer neural network architecture including one or more attention layers. However, it is appreciated that in other embodiments, the machine learning models can be configured as any other appropriate architecture including, but not limited to, long short-term memory (LSTM) networks, Markov networks, BART, generative-adversarial networks (GAN), diffusion models (e.g., Diffusion-LM), and the like.

The training dataset(s) 260 includes a plurality of training examples. In some embodiments, the training examples may be generated by applying the machine learning model to a respective initial state of the simulation environment. In some embodiments, the training examples may correspond to a pre-trained application model and the corresponding to a target application.

Computing Resource Allocation Using DRL

Figure 4:
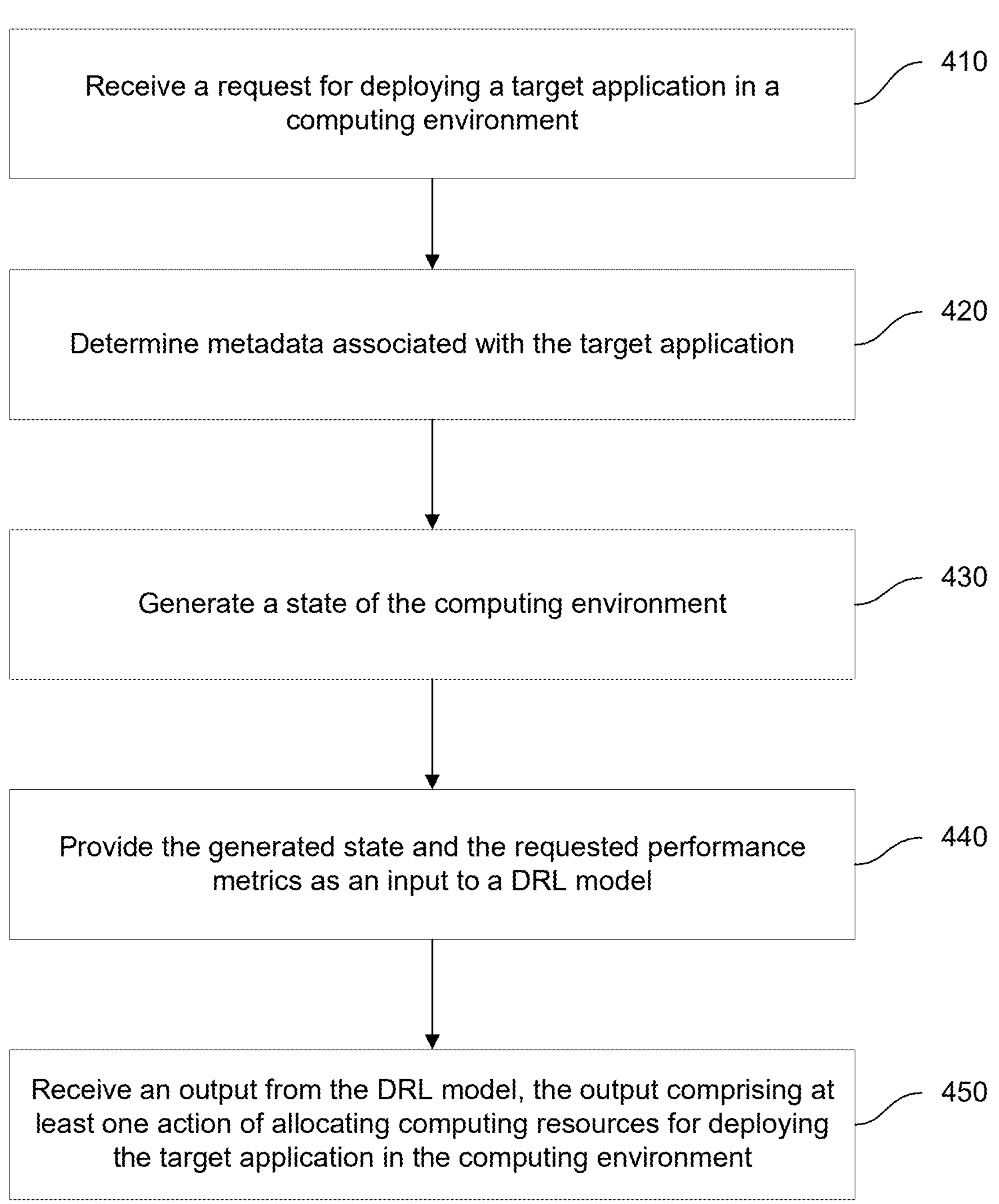
FIG. 4 is a flowchart of a method 400 for using a DRL model to output actions for allocating computing resources for deploying a target application in a computing environment.

FIG. 4 is a flowchart of a method 400 for using a DRL model to output actions for allocating computing resources for deploying a target application in a computing environment. The process shown in FIG. 4 may be performed by one or more components of the scaling system 130. Other entities may perform some or all of the steps in FIG. 4. The scaling system 130 as well as the other entities may include some or of the component of the machine (e.g., computer system) described in conjunction with FIG. 5. Embodiments may include different and/or additional steps, or perform the steps in different orders.

As shown in FIG. 4, the scaling system 130 receives 410 a request for deploying a target application in a computing environment. The request includes performance metrics for deploying the target application. The computing environment may include a set of computing resources. The scaling system 130 determines 420 metadata associated with the target application. The metadata describes a workload for deploying the target application. The scaling system 130 generates 430 a state of the computing environment. The state may represent a status of the set of computing resources and the workload of the target application. The scaling system 130 provides 440 the generated state and the requested performance metrics as an input to a deep reinforcement learning (DRL) model to receive an action of allocating the set of computing resources. The scaling system 130 receives 450 an output from the DRL model. The output includes at least one action of allocating computing resources for deploying the target application in the computing environment. In some embodiments, the output actions may include both HPA and VPA actions. For example, the output actions may include adjusting the number of pods and adjusting the CPU and/or memory sizes for each pod.

Figure 5:
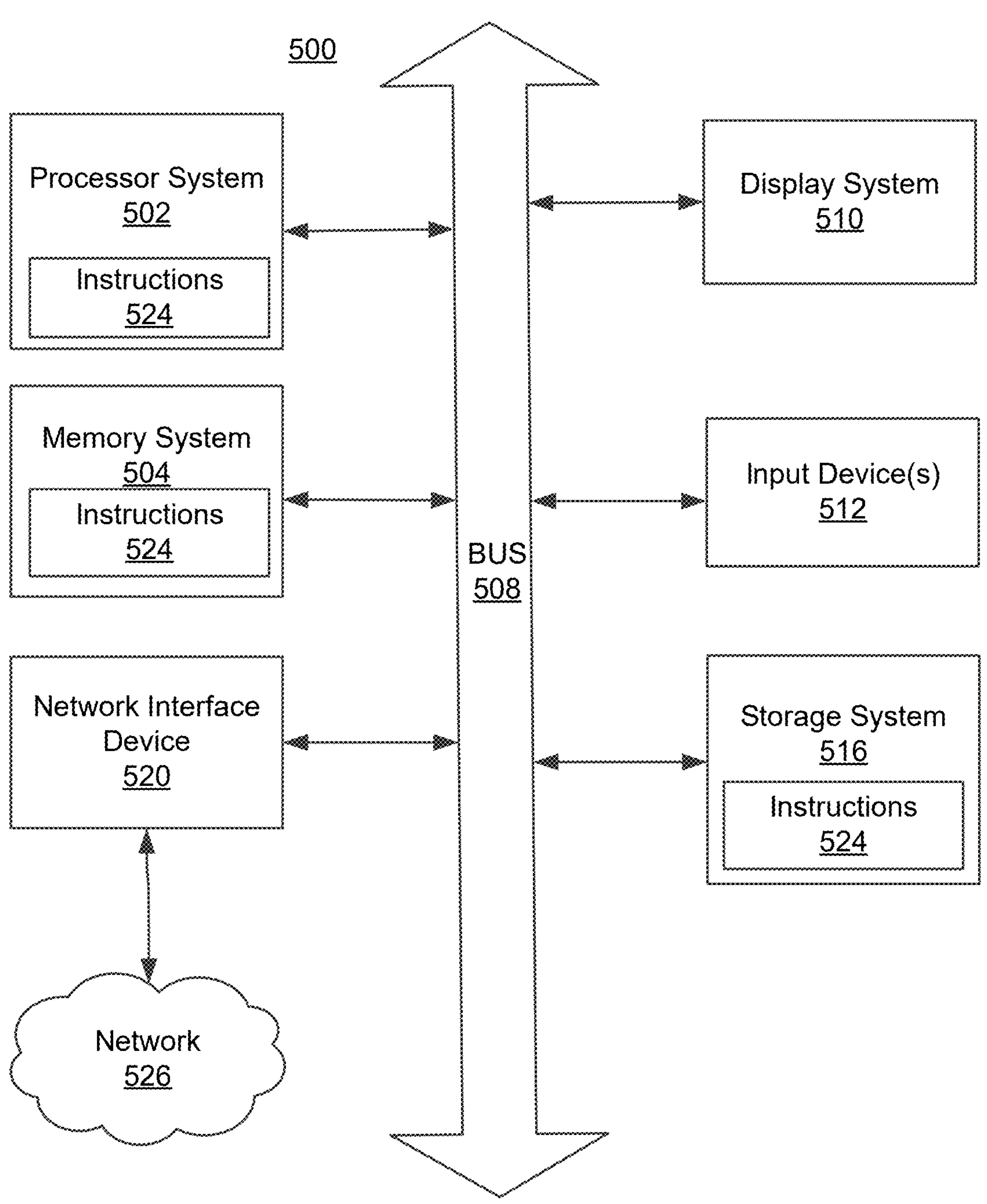
FIG. 5 illustrates one embodiment of an exemplary computer architecture.

Turning now to FIG. 5, illustrated is an example machine to read and execute computer readable instructions, in accordance with an embodiment. Specifically, FIG. 5 shows a diagrammatic representation of a scaling system. The computer system 500 is structured and configured to operate through one or more other systems (or subsystems) as described herein. The computer system 500 can be used to execute instructions 524 (e.g., program code or software) for causing the machine (or some or all of the components thereof) to perform any one or more of the methodologies (or processes) described herein. In executing the instructions, the computer system 500 operates in a specific manner as per the functionality described. The computer system 500 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 500 may be a server computer, a client computer, a personal computer (PC), a tablet PC, a smartphone, an internet of things (IoT) appliance, a network router, switch or bridge, or other machine capable of executing instructions 524 (sequential or otherwise) that enable actions as set forth by the instructions 524. Further, while only a single machine is illustrated, the term "machine" shall also be taken to include any collection of machines that individually or jointly execute instructions 524 to perform any one or more of the methodologies discussed herein.

The example computer system 500 includes a processing system 502. The processor system 502 includes one or more processors. The processor system 502 may include, for example, a central processing unit (CPU), a graphics processing unit (GPU), a tensor processing unit (TPU), a neural network processor (NPU), a digital signal processor (DSP), a controller, a state machine, one or more application specific integrated circuits (ASICs), one or more radio-frequency integrated circuits (RFICs), or any combination of these. The processor system 502 executes an operating system for the computer system 500. The computer system 500 also includes a memory system 504. The memory system 504 may include or more memories (e.g., dynamic random access memory (RAM), static RAM, cache memory). The computer system 500 may include a storage system 516 that includes one or more machine readable storage devices (e.g., magnetic disk drive, optical disk drive, solid state memory disk drive).

The storage system 516 stores instructions 524 (e.g., software) embodying any one or more of the methodologies or functions described herein. For example, the instructions 524 may include instructions for implementing the functionalities of the allocation module 220 and/or the model training module 230. The instructions 524 may also reside, completely or at least partially, within the memory system 504 or within the processing system 502 (e.g., within a processor cache memory) during execution thereof by the computer system 500, the memory system 504 and the processor system 502 also constituting machine-readable media. The instructions 524 may be transmitted or received over a network 526, such as the network 526, via the network interface system 520.

The storage system 516 should be taken to include a single medium or multiple media (e.g., a centralized or distributed database, or associated caches and servers communicatively coupled through the network interface system 520) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 500 can include a display system 510. The display system 510 may driver firmware (or code) to enable rendering on one or more visual devices, e.g., drive a plasma display panel (PDP), a liquid crystal display (LCD), or a projector. The computer system 500 also may include one or more input/output systems 512. The input/output (IO) systems 512 may include input devices (e.g., a keyboard, mouse (or trackpad), a pen (or stylus), microphone) or output devices (e.g., a speaker). The computer system 500 also may include a network interface system 520. The network interface system 520 may include one or more network devices that are configured to communicate with an external network 526. The external network 526 may be a wired (e.g., ethernet) or wireless (e.g., WiFi, BLUETOOTH, near field communication (NFC).

The processor system 502, the memory system 504, the storage system 516, the display system 510, the IO systems 512, and the network interface system 520 are communicatively coupled via a computing bus 508.

ADDITIONAL CONSIDERATIONS

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:

receiving a request for deploying a target application in a computing environment, the request comprising user-requested performance metrics for deploying the target application and the computing environment comprising a set of computing resources, the user-requested performance metrics comprising at least one of an error rate and a latency of the target application when deployed;

determining metadata associated with the target application, the metadata describing a workload for deploying the target application;

generating a state of the computing environment, the state representing a status of the set of computing resources and the workload of the target application;

providing the generated state and the user-requested performance metrics as an input to a deep reinforcement learning (DRL) model, wherein the DRL model uses the user-requested performance metrics in a reward function, which causes the DRL model to be trained to allocate resources in a manner that optimizes the user-requested performance metrics;

receiving an output from the DRL model, the output comprising a recommendation of at least one allocation of computing resources for deploying the target application in the computing environment, the recommendation comprising both a horizontal pod scaling action and a vertical pod scaling action received from the DRL model, the vertical pod scaling tuned to prevent over-provisioning within a pod notwithstanding the horizontal pod scaling; and performing the at least one allocation of computing resources to the generated state of the computing environment.

2. The method of claim 1, wherein the DRL model was trained by:

creating a simulation environment that emulates the computing environment for deploying the target application;

generating a dynamic training dataset comprising a plurality of training examples, each training example generated by applying the DRL model to a respective initial state of the simulation environment, wherein generating a training example comprises:

determining an initial state of the simulation environment;

applying the DRL model to the initial state to output an action of allocating computing resources in the simulation environment;

obtaining a resulting state of the simulation environment by performing the output action on the initial state of the simulation environment; and determining a value of a reward function based on the resulting state of the simulation environment, the value of the reward function reflecting user-requested performance metrics for deploying the target application in the simulation environment; and iteratively updating parameters of the DRL model using one or more training examples.

3. The method of claim 2, further comprising:

obtaining a resulting state of the computing environment;

determining a reward value of the reward function based on the resulting state of the computing environment; and updating the parameters of the DRL model based on the generated state, the at least one allocation of computing resources, the resulting state and the reward value.

4. The method of claim 1, wherein receiving an output from the DRL model comprises receiving both a horizontal pod scaling action and a vertical pod scaling action from the DRL model.

5. The method of claim 1, wherein the at least one allocation of computing resources comprises one or more of: adjusting a number of pods in a computing cluster, modifying requests of CPU in a pod, and modifying requests of memory in a pod.

6. The method of claim 1, wherein generating the state of the computing environment comprises:

determining at least information of a number of pods, CPU utilization, and memory usage of a computing cluster in the computing environment.

7. The method of claim 1, further comprising:

providing the metadata associated with the target application to a machine learning model to predict a dynamic workload of the target application;

receiving the predicted dynamic workload of the target application;

generating a predicted state of the computing environment, the predicted state representing the status of the set of computing resources and the predicted workload of the target application;

applying the DRL model to the predicted state and the user-requested performance metrics; and receiving a dynamic output from the DRL model, the dynamic output comprising one or more actions of allocating computing resources based on the predicted dynamic workload.

8. A non-transitory computer readable storage medium comprising stored program code, the program code comprising instructions, the instructions when executed causes a processor system to:

receive a request for deploying a target application in a computing environment, the request comprising user-requested performance metrics for deploying the target application and the computing environment comprising a set of computing resources, the user-requested performance metrics comprising one or more of error rate, operation cost, and latency for deploying the target application;

determine metadata associated with the target application, the metadata describing a workload for deploying the target application;

generate a state of the computing environment, the state representing a status of the set of computing resources and the workload of the target application;

provide the generated state and the user-requested performance metrics as an input to a deep reinforcement learning (DRL) model, wherein the DRL model uses the user-requested performance metrics in a reward function, which causes the DRL model to be trained to allocate resources in a manner that optimizes the user-requested performance metrics;

receive an output from the DRL model, the output comprising a recommendation of at least one allocation of computing resources for deploying the target application in the computing environment, the recommendation comprising both a horizontal pod scaling action and a vertical pod scaling action received from the DRL model, the vertical pod scaling tuned to prevent over-provisioning within a pod notwithstanding the horizontal pod scaling; and perform the at least one allocation of computing resources to the generated state of the computing environment.

9. The non-transitory computer readable storage medium of claim 8, wherein the DRL model was trained by:

creating a simulation environment that emulates the computing environment for deploying the target application;

generating a dynamic training dataset comprising a plurality of training examples, each training example generated by applying the DRL model to a respective initial state of the simulation environment, wherein generating a training example comprises:

determining an initial state of the simulation environment;

applying the DRL model to the initial state to output an action of allocating computing resources in the simulation environment;

obtaining a resulting state of the simulation environment by performing the output action on the initial state of the simulation environment; and determining a value of a reward function based on the resulting state of the simulation environment, the value of the reward function reflecting user-requested performance metrics for deploying the target application in the simulation environment; and iteratively updating parameters of the DRL model using one or more training examples.

10. The non-transitory computer readable storage medium of claim 9, wherein the instructions when executed further cause the processor system to:

obtain a resulting state of the computing environment;

determine a reward value of the reward function based on the resulting state of the computing environment; and update the parameters of the DRL model based on the generated state, the at least one allocation of computing resources, the resulting state and the reward value.

11. The non-transitory computer readable storage medium of claim 8, wherein the output includes both a horizontal pod scaling action and a vertical pod scaling action.

12. The non-transitory computer readable storage medium of claim 8, wherein the at least one allocation of computing resources comprises one or more of: adjusting a number of pods in a computing cluster, modifying requests of CPU in a pod, and modifying requests of memory in a pod.

13. The non-transitory computer readable storage medium of claim 8, wherein the state of the computing environment comprises at least information of a number of pods, CPU utilization, and memory usage of a computing cluster in the computing environment.

14. The non-transitory computer readable storage medium of claim 8, wherein the instructions when executed further cause the processor system to:
- provide the metadata associated with the target application to a machine learning model to predict a dynamic workload of the target application;
- receive the predicted dynamic workload of the target application;
- generate a predicted state of the computing environment, the predicted state representing the status of the set of computing resources and the predicted workload of the target application;
- apply the DRL model to the predicted state and the user-requested performance metrics; and
- receive a dynamic output from the DRL model, the dynamic output comprising one or more actions of allocating computing resources based on the predicted dynamic workload.

15. A system comprising:
- a processor; and
- memory coupled to the processor, the memory configured to store code comprising instructions, wherein the instructions, when executed by the processor, cause the processor to:
  - receive a request for deploying a target application in a computing environment, the request comprising user-requested performance metrics for deploying the target application and the computing environment comprising a set of computing resources, the user-requested performance metrics comprising at least one of an error rate and a latency of the target application when deployed;
  - determine metadata associated with the target application, the metadata describing a workload for deploying the target application;
  - generate a state of the computing environment, the state representing a status of the set of computing resources and the workload of the target application;
  - provide the generated state and the user-requested performance metrics as an input to a deep reinforcement learning (DRL) model, wherein the DRL model uses the user-requested performance metrics in a reward function, which causes the DRL model to be trained to allocate resources in a manner that optimizes the user-requested performance metrics;
  - receive an output from the DRL model, the output comprising a recommendation of at least one allocation of computing resources for deploying the target application in the computing environment, the recommendation comprising both a horizontal pod scaling action and a vertical pod scaling action received from the DRL model, the vertical pod scaling tuned to prevent over-provisioning within a pod notwithstanding the horizontal pod scaling; and
  - perform the at least one allocation of computing resources to the generated state of the computing environment.

16. The system of claim 15, wherein the DRL model was trained by:
- creating a simulation environment that emulates the computing environment for deploying the target application;
- generating a dynamic training dataset comprising a plurality of training examples, each training example generated by applying the DRL model to a respective initial state of the simulation environment, wherein generating a training example comprises:
  - determining an initial state of the simulation environment;
  - applying the DRL model to the initial state to output an action of allocating computing resources in the simulation environment;
  - obtaining a resulting state of the simulation environment by performing the output action on the initial state of the simulation environment; and
  - determining a value of a reward function based on the resulting state of the simulation environment, the value of the reward function reflecting user-requested performance metrics for deploying the target application in the simulation environment; and
- iteratively updating parameters of the DRL model using one or more training examples.

17. The system of claim 16, wherein the instructions, when executed by the processor, cause the processor to:
- obtain a resulting state of the computing environment;
- determine a reward value of the reward function based on the resulting state of the computing environment; and
- update the parameters of the DRL model based on the generated state, the at least one allocation of computing resources, the resulting state and the reward value.

18. The system of claim 15, wherein the output includes both a horizontal pod scaling action and a vertical pod scaling action.

19. The system of claim 15, wherein the state of the computing environment comprises at least information of a number of pods, CPU utilization, and memory usage of a computing cluster in the computing environment.

20. The system of claim 15, wherein the instructions, when executed by the processor, cause the processor to:
- provide the metadata associated with the target application to a machine learning model to predict a dynamic workload of the target application;
- receive the predicted dynamic workload of the target application;
- generate a predicted state of the computing environment, the predicted state representing the status of the set of computing resources and the predicted workload of the target application;
- apply the DRL model to the predicted state and the user-requested performance metrics; and
- receive a dynamic output from the DRL model, the dynamic output comprising one or more actions of allocating computing resources based on the predicted dynamic workload.

* * * * *